H. B. CHAMBERS.
ADJUSTABLE WASHER.
APPLICATION FILED OCT. 6, 1915.

1,191,565.

Patented July 18, 1916.

Inventor
H·B·Chambers·

Witnesses

UNITED STATES PATENT OFFICE.

HARRY B. CHAMBERS, OF FAIRBANKS, INDIANA.

ADJUSTABLE WASHER.

1,191,565.  Specification of Letters Patent.  Patented July 18, 1916.

Application filed October 6, 1915. Serial No. 54,400.

*To all whom it may concern:*

Be it known that I, HARRY B. CHAMBERS, a citizen of the United States, residing at Fairbanks, in the county of Sullivan and State of Indiana, have invented certain new and useful Improvements in Adjustable Washers; and I do hereby declare the following to be a full, clear, and exact description of the invention, such as will enable others skilled in the art to which it appertains to make and use the same.

This invention has for its object to provide a washer of simple and inexpensive construction, which may be adjusted to fit bolts of various sizes.

Another object is the provision of an adjustable washer which will lie perfectly flat between the object and the nut.

Figure 1:
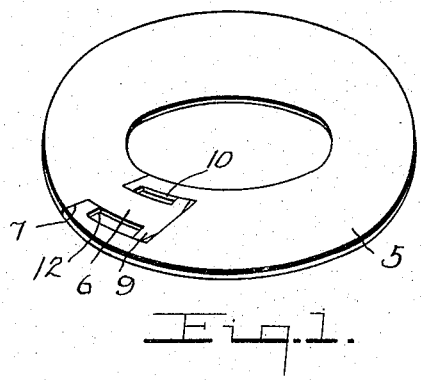
Figure 2:
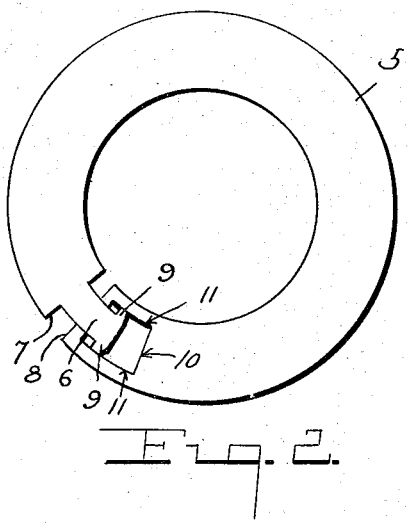
Figure 3:
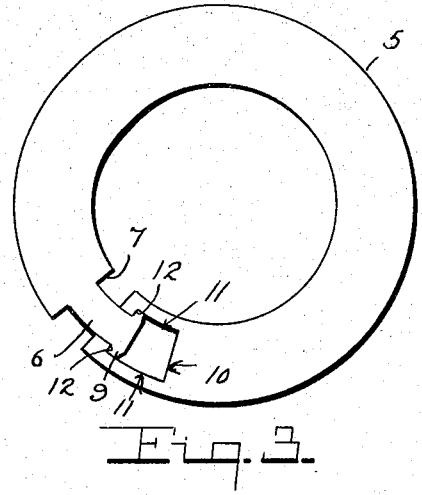

With these and other objects in view, the invention consists in the novel construction, arrangement and formation of parts as will be hereinafter specifically described, claimed and illustrated in the accompanying drawing, in which:

Figure 1 represents a perspective view of the improved washer. Fig. 2 represents a top plan view thereof, and Fig. 3 represents a top plan view of the washer, showing the same extended or adjusted to receive a large bolt.

Referring to the drawing in detail, wherein similar reference numerals designate corresponding parts throughout the several views, the numeral 5 indicates the body of the washer which is of the usual annular formation and one end 6 thereof is reduced, the shoulders 7 defined by the reduced end 6 being disposed radially of the body so as to snugly fit with the extremities 8 of the opposite end. The free extremity of the reduced portion 6 is formed with a pair of lateral projections or enlargements 9.

The opposite end of the body 5 is formed with a recess 10, the side walls 11 of which are disposed concentric with the edges of the body 5 and the outer end thereof is reduced to provide a pair of shoulders 12 adapted to engage the lateral enlargements 9 of the reduced end 6 to prevent the last mentioned end from being withdrawn from engagement within the recess 10.

In use, the washer is placed upon the bolt (not shown) in the usual manner, and is subsequently reduced in diameter to snugly fit the bolt, the reduced end 6 and lateral enlargement 9 sliding within the recess 10. If desired, the washer may be formed of spring metal and in normal position may be disposed in the adjustment illustrated in Fig. 1 and thus may be enlarged against its own tension to fit bolts of various sizes. It will be clearly understood that when the washer is disposed between an object and a nut it is practically impossible to disengage or unlock the end thereof.

What I claim is:

1. An adjustable washer including an annular body having relatively movable free ends, and means securing the free ends of said body against separation.

2. An adjustable washer including an annular body having a recessed end, and means at the opposite end slidably mounted within said recess preventing the removal of said ends.

3. An adjustable washer including an annular body having one end recessed, the opposite end being reduced, said recess having its outer end reduced to define a pair of shoulders, and lateral enlargements on said reduced end adapted to engage said shoulders to prevent the disengagement of said ends.

In testimony whereof I affix my signature in presence of two witnesses.

HARRY B. CHAMBERS.

Witnesses:
JOHN O. POGUE,
W. H. BRADBURY.

Copies of this patent may be obtained for five cents each, by addressing the "Commissioner of Patents, Washington, D. C."